May 29, 1962
E. J. SEAFELDT
3,036,546
LOW PRESSURE TIRE ALARM
Filed Dec. 23, 1959
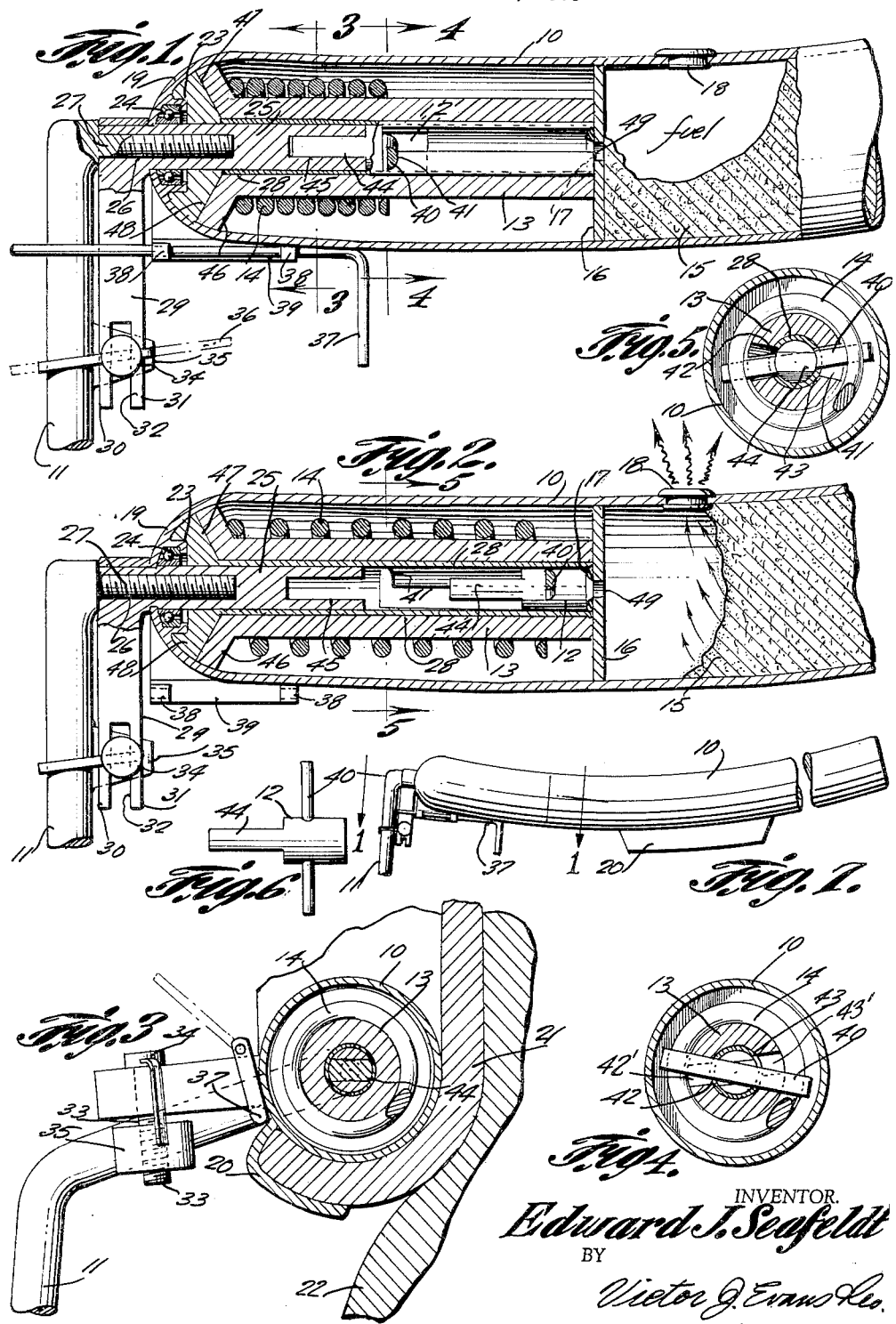
INVENTOR.
Edward J. Seafeldt
BY
Victor J. Evans Co.
ATTORNEYS United States Patent Office 3,036,546
Patented May 29, 1962

3,036,546
LOW PRESSURE TIRE ALARM
Edward J. Seafeldt, 926 Newell St., Bellingham, Wash.
Filed Dec. 23, 1959, Ser. No. 861,627
1 Claim. (Cl. 116—34)

This invention relates to alarms for warning an operator of a motor vehicle that the pressure in a tire of a vehicle is dangerously low, and in particular a small tube substantially of the same size as a balancing weight of a wheel of a vehicle with an arm extended at one end for engaging the side of a tire, and with a spring driven hammer actuated by the arm for firing a cap to ignite a combustible material in the tube which produces gas under pressure and the gas escapes through a whistle in the wall of the tube to sound an alarm.

The purpose of this invention is to provide an alarm for use on a motor vehicle wheel which sounds an alarm when pressure in a tire on the wheel drops below a predetermined amount.

With this thought in mind this invention contemplates an arcuate tubular casing designed to be crimped on a rim of a wheel having a pneumatic tire thereon with an arm extended laterally from one end of the casing and positioned to contact the outer surface of the wall of the tire, and with fuel and fuel igniting means in the casing and positioned to be fired upon outward movement of the arm resulting from deflation of the tire whereby pressure developed by the burning fuel escapes through a whistle in the wall of the tubular casing sounding an alarm.

The object of this invention is to provide an alarm for warning an operator of a vehicle that a tire is soft in which an independent alarm is mounted on each wheel of the vehicle.

Another object of the invention is to provide a signal for warning an operator of a vehicle that a tire is soft in which the unit may be installed on a wheel of a vehicle by the average layman without removing the wheel from the vehicle, and without changing the wheel.

Another important object of the invention is to provide a low pressure alarm for tires of motor vehicles in which the same alarm may be used on vehicles of substantially all manufacturers.

A further object of the invention is to provide a low pressure alarm for tires of motor vehicles in which the alarm is of simple and economical construction.

With these and other objects and advantages in view the invention embodies a tubular casing, means for mounting the casing on a rim of a motor vehicle wheel, an arm rotatably mounted in the casing and extended laterally from one end thereof whereby with the casing crimped on the rim of a wheel the arm is positioned to engage the outer surface of a wall of a tire on the wheel, a spring actuated hammer in the casing, fuel in the casing, and a cap in the casing and positioned to be ignited by the hammer, the cap being arranged to ignite the fuel whereby pressure resulting from the burning fuel escapes through a whistle in a wall of the casing, sounding an alarm.

Other features and advantages of the invention will appear from the following description taken in connection with the drawings, wherein:

FIGURE 1 is a longitudinal sectional view on the line 1—1 of FIGURE 7, the view being on an enlarged scale and taken through a portion of a tubular casing with parts broken away and showing a hammer in the casing with the hammer in the cocked position.

FIGURE 2 is a section similar to that shown in FIGURE 1, the section being on an enlarged scale and also being taken on the line 1—1 of FIGURE 7, the section showing the hammer in the discharged position and with the fuel burning.

FIGURE 3 is a cross section through the tubular casing of the alarm taken on line 3—3 of FIGURE 1, and showing a portion of a rim of a wheel and also a portion of a tire on the rim.

FIGURE 4 is a cross section through the casing taken on line 4—4 of FIGURE 1 showing a latch for retaining the hammer of the alarm in the cocked position.

FIGURE 5 is a cross section through the casing taken on line 5—5 of FIGURE 2 showing the latch in the released position.

FIGURE 6 is a view showing the hammer with the latching pin extended from the head thereof.

FIGURE 7 is a view showing the tire engaging arm with associated elements at one end of an arcuate tubular casing.

Referring now to the drawing wherein like reference characters designate corresponding parts the low pressure tire alarm of this invention includes an arcuate tubular casing 10, an arm 11 rotatably mounted in the casing and extended laterally from one end thereof, a hammer 12 slidably mounted in a sleeve 13 in the casing, a spring 14 also positioned in the casing for actuating the hammer, a fuel chamber 15 in the casing and separated from the spring chamber by a partition 16, and an annular cap 17 positioned to be ignited by the hammer 12 for igniting combustible fuel in the chamber 15 whereby pressure is built up in the chamber 15 for actuating a whistle 18 in the wall of the casing.

The casing 10 is provided with semi-spherical ends 19, and the outer surface is provided with a mounting clip 20 by which the casing is crimped on a rim 21 of a wheel on which a tire 22 is positioned, as shown in FIGURE 3. The rounded end or nose 19 of the casing is provided with a cage 23 in which a ball bearing 24 is positioned, and a shaft 25 is rotatably mounted by the ball bearing in the casing. The shaft is provided with an internally threaded socket 26 in which a stud 27 extended from the arm 11 is threaded, whereby the arm 11 is mounted in the shaft. The shaft 25 extends into a tube 28 in the sleeve 13, and the outer end of the shaft is formed to provide a lever 29, the end of which is bifurcated forming fingers 30 and 31 with a slot 32 between the fingers. A stud 33 having a head 34 is positioned in the slot 32 and the lower end is threaded in a boss 35 on the arm 11, as shown in FIGURE 3. The head of the stud is provided with a bar 36 which, with the parts in position on a rim of a wheel, and with the arm resting against the surface of a tire on the wheel, is bent whereby the ends are wrapped over the lever 29 and boss 35.

With the ends of the adjusting lever or bar 36 bent around the arm 11 and trigger adjusting arm 29 the safety lock pin 37, slidably mounted in guides 38 on a support 39, is removed, as shown in FIGURE 2. With the safety lock pin removed the arm 11 is free to be rotated by a bulging tire, and as the arm 11 is rotated the spring holding pin 40 is moved from the ledge 41 releasing the spring 14 so that the spring drives the hammer 12 against the cap 17. The tube 28 is provided with slots 42 and 43 that provide guides for the pin 40. The sleeve 13 is provided with slots 42' and 43' in registry with the slots 42 and 43, respectively, as shown in FIGURE 4.

In the cocked or set position a shank 44 of the hammer 12 is positioned in a socket 45 of the shaft 25, thereby providing a coupling with the flat shank 44 turning the hammer and spring holding pin 40 so that the pin 40 rides off of the ledge 41.

The sleeve 13 is provided with an outwardly flared end 46 providing an area 47 for a moisture seal, as indicated by the numeral 48.

The partition 16 is provided with an opening 49 through which the fuel in the chamber 15 is ignited, as the cap 17 is ignited.

With the parts assembled as illustrated and described the casing 10 is secured on a rim of a wheel by crimping the clip 20 over the rim 21 of a wheel. The casing is secured to the rim by the clip and the arm 11 is actuated to bear against the outer surface of a tire 22. The safety lock pin 37 is then withdrawn and ends of the bar 36 are wrapped around the arm 11 and trigger adjusting arm 29. The parts are now in position for operation.

Should the pressure in the tire drop the tire will bulge moving the arm 11 outwardly, and turning the shaft 25 whereby the pin 40 is moved from the ledge or seat 41, and the spring released so that the hammer, through which the pin 40 extends, is driven against the cap 17, firing the cap and igniting fuel in the chamber 15. Upon igniting combustible fuel in the chamber 15 pressure is built up and the escaping gas passing through the whistle 18 sounds an alarm, calling the attention of an operator of a vehicle upon which the tire is positioned to the fact that the pressure of a tire of the vehicle is low. There are many slow burning combustible fuels that upon the burning thereof will produce a gas under pressure that will when incorporated in the low pressure alarm embodying the invention serve to sound the alarm to indicate the lower pressure of a vehicle tire. A well-known fuel that is produced in solid or semi-solid consistency is a combination of nitro-glycerine, nitro-cellulose and a solvent such as acetone. Solidified picric acid and gun cotton or trinitrotoluene may also be used. It is believed, however, that the particular type of fuel that is to be used in applicant's device should not be limited as there are many that are available on the open market for this purpose.

Upon installing the low pressure alarm on a wheel of a vehicle it will be necessary to balance the wheel, and one of the conventional balancing weights of the wheel may be replaced by the casing 10 with the alarm elements incorporated therein.

It will be understood that modifications, within the scope of the appended claim, may be made in the design and arrangement of the parts without departing from the sprit and intention of the invention.

What is claimed is:

In a tire alarm device including a tubular casing having closed ends and being conformably shaped to fit against the rim of a vehicle tire, means projecting from said casing intermediate the ends thereof for securing said casing to the rim of a vehicle wheel, a transversely arranged partition sub-dividing said casing into a fuel charge chamber and a spring chamber, a charge of combustible material in said fuel chamber, said partition being provided with a centrally disposed opening, a sleeve extending longitudinally within said spring chamber and having one end bearing against said partition and having the other end provided with a flared shoulder supported on the wall of said casing adjacent one end of said casing, said sleeve being spaced from the inner wall of said casing, a rotatable shaft having the portion adjacent one end extending into said sleeve through said other end of the latter and having the portion adjacent the other end exteriorly of said casing, said one end portion of said shaft being provided with a socket opening outwardly of said one end, a hammer normally seated in said socket and movable in said sleeve from said socket to a position of which one end thereof is adjacent to and abuts said partition, a fulminating cap on said partition adjacent the opening therein and in the path of movement of said hammer, said sleeve being provided with a slot extending longitudinally thereof from a point adjacent said shaft socket to said partition, a pin projecting perpendicularly from said hammer and slidable in said slot, a coil spring circumposed about said sleeve and having one end bearing against the flared shoulder of said sleeve and having the other end bearing against said pin, said sleeve slot having a bayonet cutout portion in the end adjacent said shoulder, said spring normally being compressed and held against expansion by the end portion of said pin when seated in the cutout portion of said slot, said hammer being connected to said shaft for rotation therewith so that upon rotation of said shaft in one direction said pin is forced from said cutout portion to release said spring for driving said hammer into engagement with said cap, and an arm projecting perpendicularly from said shaft other end and adapted to bear against the side wall of the tire when mounted on said rim, said arm when said casing is mounted on said rim and the tire bulging outwardly being movable by the bulge in said tire to rotate said shaft in said one direction and release said pin.

References Cited in the file of this patent

UNITED STATES PATENTS

| | | |
|---|---|---|
| 1,138,407 | Phelps | May 4, 1915 |
| 1,506,947 | Schroeder | Sept. 2, 1924 |
| 1,603,787 | Menchen | Oct. 19, 1926 |
| 2,798,449 | Catlin | July 9, 1947 |

FOREIGN PATENTS

| | | |
|---|---|---|
| 497,095 | France | Nov. 25, 1919 |